(12) United States Patent
Saito et al.

(10) Patent No.: US 7,897,536 B2
(45) Date of Patent: Mar. 1, 2011

(54) NANOCAPSULE-TYPE STRUCTURE

(75) Inventors: Takeshi Saito, Ibaraki (JP); Satoshi Ohshima, Ibaraki (JP); Motoo Yumura, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 823 days.

(21) Appl. No.: 11/663,002

(22) PCT Filed: Aug. 31, 2005

(86) PCT No.: PCT/JP2005/015909
§ 371 (c)(1),
(2), (4) Date: Mar. 15, 2007

(87) PCT Pub. No.: WO2006/030642
PCT Pub. Date: Mar. 23, 2006

(65) Prior Publication Data
US 2007/0267287 A1    Nov. 22, 2007

(30) Foreign Application Priority Data
Sep. 17, 2004    (JP) ................. P. 2004-271751

(51) Int. Cl.
*B01J 21/18* (2006.01)
*B01J 23/30* (2006.01)
*B01J 31/00* (2006.01)
*B32B 9/00* (2006.01)
*B32B 33/00* (2006.01)
*B32B 5/16* (2006.01)
*B32B 15/02* (2006.01)
*B32B 17/02* (2006.01)
*B32B 19/00* (2006.01)
*B32B 21/02* (2006.01)
*B32B 23/02* (2006.01)
*B32B 27/02* (2006.01)
*B32B 25/00* (2006.01)
*B32B 27/00* (2006.01)

(52) U.S. Cl. ......... 502/180; 502/150; 502/162; 502/182; 977/742; 977/750; 977/752; 977/842; 977/900; 428/40.2; 428/402; 428/402.21; 428/402.22; 428/402.24

(58) Field of Classification Search .................. 502/180, 502/182, 162, 150; 977/742, 750, 752, 842, 977/900; 428/40.2, 402–402.24
See application file for complete search history.

(56) References Cited

U.S. PATENT DOCUMENTS
3,503,783 A * 3/1970 Evans ............................. 427/10
(Continued)

FOREIGN PATENT DOCUMENTS
CN    1515354    7/2004
(Continued)

OTHER PUBLICATIONS

"Synthesis and diameter-control of single-walled carbon nanotubes by the DIPS method with the nanocapsule catalyst," Takeshi Saito et al. Nippon Kagakkai Koen Yokoshu, vol. 84, Issue No. 1 (2005), p. 383.*

(Continued)

*Primary Examiner* — Patricia L Hailey
(74) *Attorney, Agent, or Firm* — Morgan, Lewis & Bockius LLP (57) ABSTRACT

The present invention relates to a nanocapsule-type structure having an average particle diameter of 1 to 50 nm, said nanocapsule-type structure comprising an aqueous solution of a metal compound encapsulated in the inside thereof. Preferably, the nanocapsule-type structure is such that the nanocapsule structure is formed by self-organization of a surfactant in an organic solvent. This nanocapsule structure is in a nanometer size, and high in dispersibility even in a high-concentration region in an organic solvent, and does not undergo aggregation, and it is useful as a catalyst for a CVD method.

2 Claims, 6 Drawing Sheets

U.S. PATENT DOCUMENTS

| | | | | |
|---|---|---|---|---|
| 3,813,345 | A * | 5/1974 | Urton | 516/54 |
| 4,714,692 | A * | 12/1987 | Abrevaya et al. | 502/261 |
| 4,714,693 | A * | 12/1987 | Targos | 502/261 |
| 5,147,841 | A * | 9/1992 | Wilcoxon | 502/173 |
| 5,283,217 | A * | 2/1994 | Ikura et al. | 502/167 |
| 5,770,172 | A * | 6/1998 | Linehan et al. | 423/561.1 |
| 5,814,370 | A * | 9/1998 | Martino et al. | 427/213.35 |
| 6,413,489 | B1 * | 7/2002 | Ying et al. | 423/600 |
| 7,488,698 | B2 * | 2/2009 | Kobayashi | 502/159 |
| 2007/0248528 | A1 * | 10/2007 | Kim | 423/447.1 |

FOREIGN PATENT DOCUMENTS

| | | | |
|---|---|---|---|
| EP | 1790612 A1 | * | 5/2007 |
| JP | 2-6617 | | 1/1990 |
| JP | 2-6617 | * | 10/1990 |
| JP | 5-222116 | | 8/1993 |
| JP | 2000-117094 | * | 4/2000 |
| JP | 2000-212445 | | 8/2000 |
| JP | 2001-062299 | * | 3/2001 |
| JP | 2001-62299 | | 3/2001 |
| JP | 3438041 | | 6/2003 |
| JP | 2004-149961 | * | 5/2004 |
| JP | 2004-513869 | | 5/2004 |
| JP | 2004-182548 | | 7/2004 |
| WO | 03/008331 | | 1/2003 |

OTHER PUBLICATIONS

Chin Li Cheung et al., "Diameter-Controlled Synthesis of Carbon Nanotubes," *Journal of Physical Chemistry B*, vol. 106, 2002 (published on Web Feb. 16, 2002), pp. 2429-2433.

Martijn Q. Slagt et al., "Encapsulation of Hydrophilic Pincer-Platinum (II) Complexes in Amphiphilic Hyperbranched Polyglycerol Nanocapsules," *Macromolecules*, American Chemical Society, vol. 35, No. 15, Jul. 16, 2002, pp. 5734-5737.

* cited by examiner

NANOCAPSULE-TYPE STRUCTURE

TECHNICAL FIELD

The present invention relates to a nanocapsule structure. More particularly, the invention relates to a capsule structure useful as a catalyst for synthesizing a material of nanometer size such as a carbon nanotube or a semiconductor nanowire with a CVD method, a raw material solution for manufacturing carbon nanotubes which contains a catalyst including the capsule structure, and a method for manufacturing carbon nanotubes using the raw material solution.

BACKGROUND OF THE INVENTION

As an effective method for synthesizing a material of nanometer size such as a carbon nanotube or a semiconductor nanowire in large quantity, there is known a chemical vapor deposition method (CVD method) in which a carbon-containing raw material containing a catalyst with a very small particle diameter is atomized, and introduced into a high-temperature electric furnace by a spray or the like for synthesis.

When metal ultrafine particles in nanometer size are used among the catalysts for use in a conventional CVD method, it is known, in addition to the advantage of the high catalytic activity caused by the large surface area of the catalyst, that the diameter of the resulting carbon nanotube can be controlled to a certain degree by the diameter of the metal ultrafine particle in the CVD synthesis of carbon nanotubes (see, Non-Patent Document 1).

However, the metal ultrafine particle catalyst in nanometer size, especially, the ultrafine particle catalyst of a metal having magnetic properties tends to aggregate due to the electric, and magnetic interactions and the like acting between the particles. Thus, there has been a problem that the catalytic performances tend to be degraded.

In order to prevent aggregation of the catalyst ultrafine particles, there have been proposed: a method in which metal ultrafine particles are simply dispersed in an organic solvent by using a surfactant (see, Patent Document 1); and a method in which metal ultrafine particles are prepared in a microemulsion, thereby to be dispersed in an organic solvent (see, Patent Document 2).

However, even with the CVD method using these catalysts, when a raw material solution containing a catalyst is introduced into a narrow channel, the dispersibility of the catalyst particles is remarkably reduced, so that the catalyst particles aggregate with each other to clog a spray nozzle. Not only this problem, but also the following serious problem is caused. Aggregation remarkably reduces the catalyst surface area, which degrades the catalytic performances. This causes the reduction of the yield.

Non-Patent Document 1: Journal of Physical Chemistry B, vol. 106, 2002 (issued on Feb. 16, 2002), p2429

Patent Document 1: JP-A-2-6617

Patent Document 2: Japanese Patent No. 3438041

DISCLOSURE OF THE INVENTION

Problems that the Invention is to Solve

It is an object of the present invention to provide a nanocapsule structure useful as a catalyst, which has a particle diameter of nanometer size, is high in dispersibility even in a high-concentration region in an organic solvent, and does not undergo aggregation; a method for utilizing the capsule structure as a catalyst for a CVD method; and a method for manufacturing carbon nanotubes using the catalyst with efficiency.

Means for Solving the Problems

The present inventors conducted an intensive study in order to solve the foregoing problems. As a result, the inventors found the followings. A nanocapsule structure including a catalyst aqueous solution encapsulated therein, and controlled in particle diameter is high in dispersibility even in a high-concentration region in an organic solvent, and does not undergo aggregation. In addition, when a raw material solution in such a state that such nanocapsule structures are uniformly dispersed in a nonpolar organic solvent is used, carbon nanotubes can be synthesized with ease and high yield by a CVD method without clogging a spray. Thus, the inventors have reached the present invention.

Namely, the present application provides the following inventions.

(1) A nanocapsule-type structure having an average particle diameter of 1 to 50 nm, said nanocapsule-type structure comprising an aqueous solution of a metal compound encapsulated in the inside thereof.

(2) The nanocapsule-type structure according to (1), which is formed by self-organization of a surfactant in an organic solvent.

(3) The nanocapsule-type structure according to (1) or (2), wherein the metal compound is at least one member selected from the group consisting of an iron group element compound, a platinum group element compound, and a molybdenum compound.

(4) The nanocapsule-type structure according to any one of (1) to (3), wherein the surfactant is at least one member selected from the group consisting of an anionic surfactant, a cationic surfactant, and a nonionic surfactant.

(5) The nanocapsule-type structure according to (4), wherein the cationic surfactant is a quaternary ammonium halide.

(6) The nanocapsule-type structure according to (5), wherein the quaternary ammonium halide is dimethyl dialkyl ammonium halide.

(7) The nanocapsule-type structure according to (6), wherein the dimethyl dialkyl ammonium halide is dimethyl dioctyl ammonium halide.

(8) A catalyst comprising the nanocapsule-type structure according to any one of (1) to (7).

(9) A catalyst for manufacturing a carbon nanotube, which comprises the nanocapsule-type structure according to any one of (1) to (7).

(10) A raw material solution for manufacturing a carbon nanotube, which contains an organic solvent and the catalyst according to (9).

(11) The raw material solution for manufacturing a carbon nanotube according to (10), wherein the organic solvent is at least one member selected from the group consisting of toluene, benzene, xylene, cyclohexane, heptane, and hexane.

(12) The raw material solution for manufacturing a carbon nanotube according to (11), which further contains a sulfur compound.

(13) The raw material solution for manufacturing a carbon nanotube according to (12), wherein the sulfur compound is thiophene.

(14) The raw material solution for manufacturing a carbon nanotube according to (13), wherein a mixing ratio (in number of atoms) of the sulfur compound to the metal compound is 0.5 to 5 times the amount in number of metal atoms of the metal compound.

(15) A method for manufacturing a carbon nanotube, which comprises thermally decomposing the raw material solution according to any one of (10) to (14).

(16) A metal ultrafine particle catalyst for manufacturing a carbon nanotube, which is obtainable by chemically reducing said nanocapsule-type catalyst according to (9), and which has an average particle diameter of 1 to 50 nm.

(17) The metal ultrafine particle catalyst for manufacturing a carbon nanotube according to (16), wherein 40 to 60 mol % of the composition of said metal ultrafine particle is molybdenum, and other composition is constituted with iron and/or cobalt.

(18) A supported catalyst comprising said metal ultrafine particle according to (16) or (17) supported on a substrate or a base material.

(19) The supported catalyst according to (18), wherein the base material is magnesium oxide.

(20) A method for manufacturing a carbon nanotube, which comprises thermally decomposing a carbon-containing material in the presence of the catalyst according to any one of (16) to (19).

ADVANTAGE OF THE INVENTION

A nanocapsule-type structure of the present invention has a structure in which an aqueous solution of a metal compound is encapsulated in the capsule structure in a nanometer size. Therefore, it has a feature of being high in dispersibility even in a high-concentration region in an organic solvent, and not undergoing aggregation. It has advantages of not clogging a narrow channel when passing therethrough, and not undergoing degradation of the catalytic performances due to the aggregation. Therefore, when this is used as a catalyst for manufacturing a carbon nanotube or a semiconductor nanowire with a CVD method, the problem such as clogging of a spray nozzle as in the related art can be solved. Thus, it is possible to manufacture carbon nanotubes with ease and high yield.

Further, the raw material solution containing an organic solvent and the catalyst including the nanocapsule structure contains both the components of a catalyst which is high in dispersibility even in a high-concentration region and does not undergo aggregation, and a carbon source. Thus, with a simple step of spraying this solution directly from a nozzle, and then thermally decomposing the same, it is possible to synthesize high-quality carbon nanotubes continuously. Therefore, it can be said that this is an industrially very advantageous raw material solution for manufacturing carbon nanotubes.

DESCRIPTION OF REFERENCE NUMERALS

1, 8 Electric furnace
2, 9 Quartz reaction tube
3 Spray nozzle
4, 5, 12 Carrier gas flowmeter
6 Microfeeder
7 Recovery filter
10, 11 Reactive gas flowmeter

BEST MODE FOR CARRYING OUT THE INVENTION

A nanocapsule-type structure of the present invention has an average particle diameter of 1 to 50 nm, and includes an aqueous solution of a metal compound encapsulated in the inside thereof.

Heretofore, capsule type structures including metal fine particles suspended in a surfactant or metal fine particles added in the microcapsule are known. However, these are of such a structure that solid-like metal fine particles are dispersed and mixed in a surfactant or in the inside thereof. Whereas, there is not at all conventionally known any nanocapsule-type structure in which metal is not dispersed in the form of a solid, but assumes a dissolved form of an aqueous solution of a metal compound, and is encapsulated as it is as in the invention.

A typical nanocapsule-type structure of the invention has a capsule-like structure formed by self-organization of a surfactant. Further, it has a structure with an average particle diameter of 1 to 50 nm, and preferably 1 to 10 nm, in which an aqueous solution of a metal compound is encapsulated in the inside portion of the capsule-like structure.

The one having an average particle diameter of less than 1 nm is required to have a thickness of the capsule-forming wall of at least 0.5 nm or less. However, this is theoretically difficult. It is difficult for the one having an average particle diameter of 50 nm or more to act as a catalyst for manufacturing a material in a nanometer size. Thus, the intended purpose of the invention cannot be attained.

Then, a description will be given to a capsule-like structure formed by self-organization of a surfactant which is a typical nanocapsule-type structure of the invention.

It is generally known that surfactants can be classified into a cationic surfactant, an anionic surfactant, a nonionic surfactant, and the like according to the difference in electric charge of the acting portion. However, the surfactants used in the invention are not particularly restricted by the difference in electric charge. Any one or two or more of the cationic, anionic, and nonionic surfactants can be used. However, among these, the cationic surfactant is preferably used.

Any cationic surfactant can be used in the invention so long as it forms a nanocapsule-like structure having an average particle diameter of 1 to 50 nanometers in a self-organizing manner in a low polarity organic solvent. It has no particular restriction on the chemical structure. However, a quaternary ammonium halide can be preferably used. Specific examples thereof include dimethyl dioctyl ammonium bromide (or chloride), didecyl dimethyl ammonium bromide (or chloride), cetyl trimethyl ammonium bromide (or chloride), cetyl dimethylethyl ammonium bromide (or chloride), and dodecyl trimethyl ammonium bromide (or chloride).

Among the quaternary ammonium halides, more preferably, dimethyl dialkyl ammonium halide is desirable. The alkyl group is preferably the one having 6 to 22 carbon atoms. It is more preferably dimethyl dialkyl ammonium halide having an alkyl group with 8 to 12 carbon atoms. It is further preferably dimethyl dioctyl ammonium halide.

The inside portion of the capsule-like structure in the nanocapsule-type catalyst of the invention is required to be an aqueous solution of a metal compound. The water of the aqueous solution is fed by the crystal water of the metal compound or the water contained as an impurity in the surfactant or the organic solvent. In addition, it can also be added during manufacturing of the capsule.

The metal compound for use in invention has no particular restriction so long as it is soluble in water. However, it is preferably selected from the compounds of metals having a catalytic action commonly used in the synthesis reaction of a desirable substance or material. Specifically, a nickel compound is preferably selected in the CVD synthesis of a nanowire of gallium nitride. As the catalysts for CVD synthesis of a carbon nanotube, there can be used any one or two or more of transition metal type compounds, specifically, for example, a compound of an iron group element such as iron (II) chloride, iron (III) chloride, cobalt chloride, or nickel chloride, a compound of a platinum group element such as rhodium chloride or platinum chloride, and a molybdenum compound such as molybdenum chloride. Among these, iron (III) chloride is preferably used.

Then, a description will be given to the details of a method for preparing the nanocapsule-type structure of the invention.

The nanocapsule-type structure of the invention can be prepared by, for example, dissolving a surfactant and a metal compound in an organic solvent so as to result in a homogeneous mixture.

The organic solvent for use in that step is preferably the nonpolar solvent. Specific examples thereof include toluene, benzene, o-xylene, m-xylene, p-xylene, cyclohexane, heptane, hexane, and the like. However, these are not limited thereto, and if required, other solvents can be selected. In these low polarity organic solvents, a surfactant forms a self-organizing capsule-like structure referred to as a reversed micelle encapsulating a polar substance such as water in the solvent.

The organic solvent to be preferably used in the invention is toluene.

As a means for dissolution, stirring, an ultrasonic treatment, or the like can be carried out if it is required. For example, for mixture with stirring, a flask or a container with a lid may be rotated, or an apparatus in which a screw type or a brush type stirring blade rotates at a high speed can be used. With the ultrasonic treatment apparatus, methods in which a container containing an organic solvent, a surfactant, and a catalyst metal compound are set in a tank of an ultrasonic washing machine, or in which an ultrasonic vibrator is put in the container for the treatment may be mentioned.

For the nanocapsule-type structures of the invention, preferably, stirring and mixing are carried out for dissolution, followed by an ultrasonic treatment, and further, undissolved precipitates are removed by a centrifugal separator to extract the supernatant. However, this method is not exclusive.

The weight ratio of the surfactant and the metal compound for use in preparation of the nanocapsule-type catalyst of the invention with respect to the organic solvent has no particular restriction. However, when the surfactant is in a small amount, or under the conditions where the metal compound solution is in a large amount, the solution separates into two layers. Thus, a homogeneous solution may not be obtained. In this case, the surfactant is required to be increased in such an amount that a homogeneous solution is achieved. The amount of the surfactant to be increased is preferably the necessary minimum amount for obtaining the homogeneous solution.

Whether the nanocapsule-type structures have been prepared or not may be checked by using a particle size distribution measuring apparatus of a dynamic light scattering method or a laser Doppler method, and monitoring the particle size distribution.

Therefore, the fact that an aqueous solution of a metal compound is encapsulated in the inside thereof can also be recognized from the formation of the reversed micelle according to the particle size distribution measurement. Moreover, the change in the state of the hydrogen bond caused by the encapsulation of water in the structure can be checked in the following manner. The absorption peak derived from the oxygen-hydrogen bond characteristic of water is observed separately from the absorption peak derived from the carbon-hydrogen bond of other components such as the solvent by a near-infrared absorption spectroscopy, thus to check the following fact: there has been an increase in amount of the components which have shifted toward the low wave number side as compared with the position of the absorption peak derived from water contained in the solvent.

The organic solvent dispersion of the nanocapsule-type structures of the invention has a feature of a remarkably high dispersibility even at a high concentration. Therefore, the composition containing the organic solvent and the nanocapsule-type catalyst can be a raw material solution for manufacturing carbon nanotubes with, for example, a CVD synthesis method.

When toluene is used as the carbon source in the CVD synthesis of carbon nanotubes, a sulfur compound, preferably thiophene is preferably added in order to improve the catalytic activity.

Particularly, for a high-concentration dispersion with a catalyst concentration in solution of 10 to 70 wt %, to the dispersion, a sulfur compound, preferably thiophene is added so that the number of sulfur atoms is 0.5 to 10 times, and preferably 0.5 to 5 times the number of catalyst metal atoms. The resulting solution is used as a raw material solution. Using hydrogen as a carrier gas, the raw material solution is sprayed to the reaction region heated to a temperature in the vicinity of 1000 to 1200° C. As a result, carbon nanotubes can be manufactured with ease and with high yield.

With the nanocapsule-type catalyst of the invention, it is easy to prepare a dispersion in which the catalyst is monodispersed in an organic solvent. By carrying out the chemical reduction of the dispersion using a reducing agent such as hydrogen or sodium borohydride, it is possible to prepare metal ultrafine particles in a monodispersed state, or in a highly dispersed state close to the monodispersed state, and it is possible to use the metal ultrafine particles as a catalyst for manufacturing carbon nanotubes.

In the invention, when the metal ultrafine particles are prepared with chemical reduction, the composition of the metal has no particular restriction. Especially, it is preferably configured such that 40 to 60 mol % of the composition is molybdenum, and that other composition is constituted with iron and/or cobalt. According to the foregoing composition, the catalyst can be held in a state dispersed in an organic solvent for a long time even in the form of metal ultrafine particles. Thus, it is readily possible to support the metal ultrafine particles on a substrate such as a silicon wafer, or a base material of zeolite, alumina, or the like. Preferably, by using magnesium oxide as a base material, it is possible to manufacture carbon nanotubes in a high density.

EXAMPLES

The invention will be described below more specifically based on examples. However, the invention is not limited to the following examples.

Example 1

Figure 1:
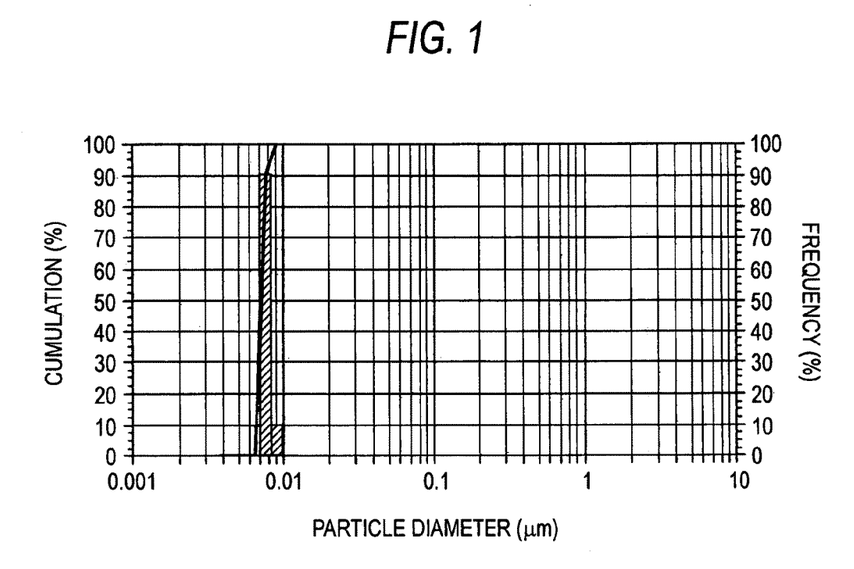
FIG. 1 is a particle size distribution diagram of a nanocapsule-type catalyst obtained in Example 1.

First, within a globe box of a nitrogen atmosphere, in a 50-mL flask, 20.0 g of toluene (manufactured by Wako Pure Chemical Industries, Ltd., reagent guaranteed grade, the same applies hereinafter) was charged. As nanocapsule-type catalyst raw materials, 3.20 g of dimethyl dioctyl ammonium bromide (manufactured by Tokyo Chemical Industry Co., Ltd., the same applies hereinafter), 700 mg of iron (III) chloride (manufactured by Furuuchi Chemical Corporation, purity 99.9%, the same applies hereinafter), and 90.0 mg of molybdenum chloride (manufactured by Wako Pure Chemical Industries, Ltd., the same applies hereinafter) were added, and stirred for 15 minutes. Preparation in this ratio results in a concentration in solution of the catalyst in the solution of 16.6 wt %. When insoluble matters were precipitated, an ultrasonic treatment was carried out for 30 minutes by means of an ultrasonic washing machine (1210J, manufactured by Branson Co.) under a nitrogen atmosphere. Then, the solution was subjected to centrifugation under the conditions of 6000 rpm by means of a centrifugal separator (himac CT13, manufactured by Hitachi Koki Co., Ltd., the same applies hereinafter). Thus, insoluble matters were removed, and the supernatant was fractionated. The supernatant solution was measured by means of a particle size distribution apparatus (Microtrack UPA150, manufactured by Nikkiso Co. Ltd.). As a result, almost all the nanocapsule-type catalysts (structures) had a particle diameter of 7 to 10 nm. The graph of the particle size distribution is shown FIG. 1 (concentration in solution of catalyst 16.6 wt %).

Example 2

To the toluene solution of the nanocapsule-type catalyst prepared in the same manner as in Example 1, thiophene (manufactured by Wako Pure Chemical Industries, Ltd., reagent guaranteed grade, the same applies hereinafter) was added so as to be in amounts 0.5, 1, and 5 times by mol the amount in number of moles of the iron which was the catalyst. As a result, three types of raw material solutions for manufacturing carbon nanotubes were prepared. Respective ones were referred to as raw material solutions 1, 2, and 3.

Figure 2:
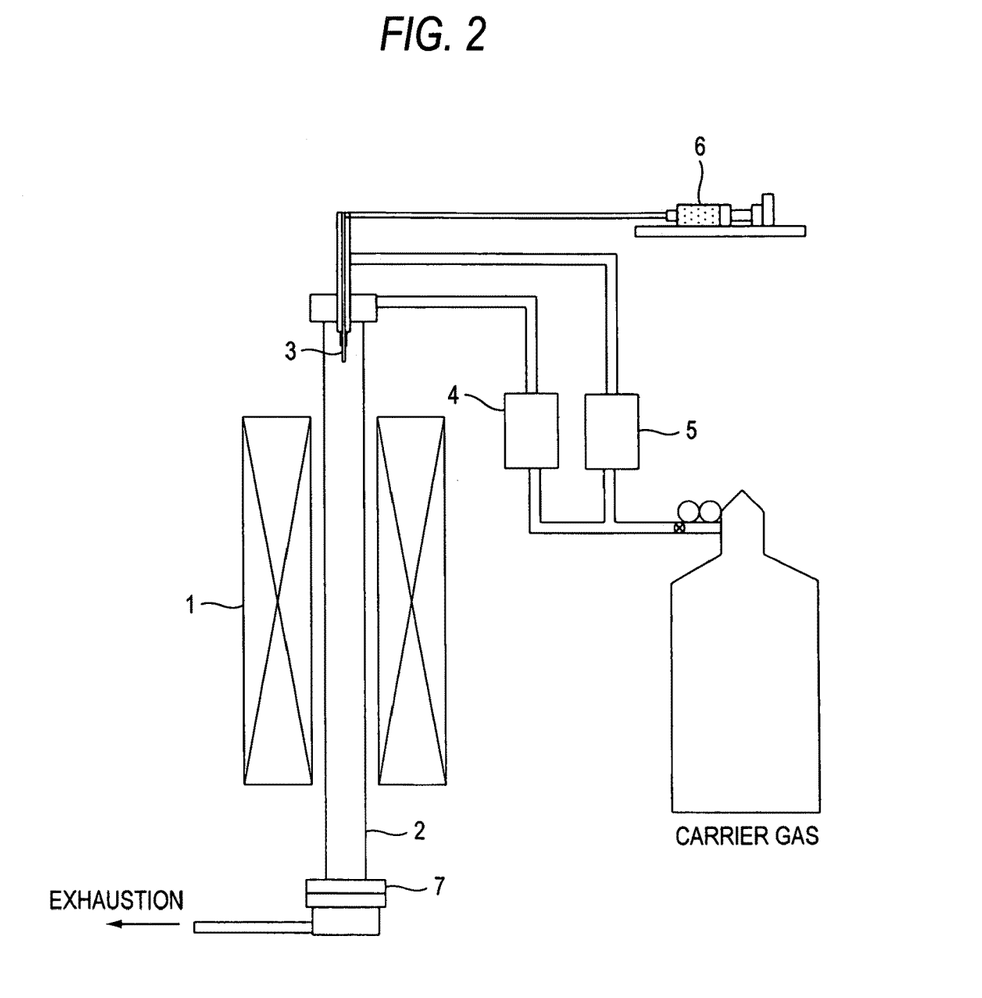
FIG. 2 is a schematic diagram of a carbon nanotube manufacturing apparatus used in Examples 2 to 4.

By using the raw material solutions, carbon nanotubes were manufactured by means of a carbon nanotube manufacturing apparatus as shown in FIG. 2. The manufacturing apparatus in accordance with FIG. 2 includes a 4-kW electric furnace 1, a reaction tube 2 made of quartz, with an internal diameter of 5.0 cm and an external diameter of 5.5 cm, a spray nozzle 3, a first carrier gas flowmeter 4, a second carrier gas flowmeter 5, a microfeeder 6, and a recovery filter 7.

Figure 3:
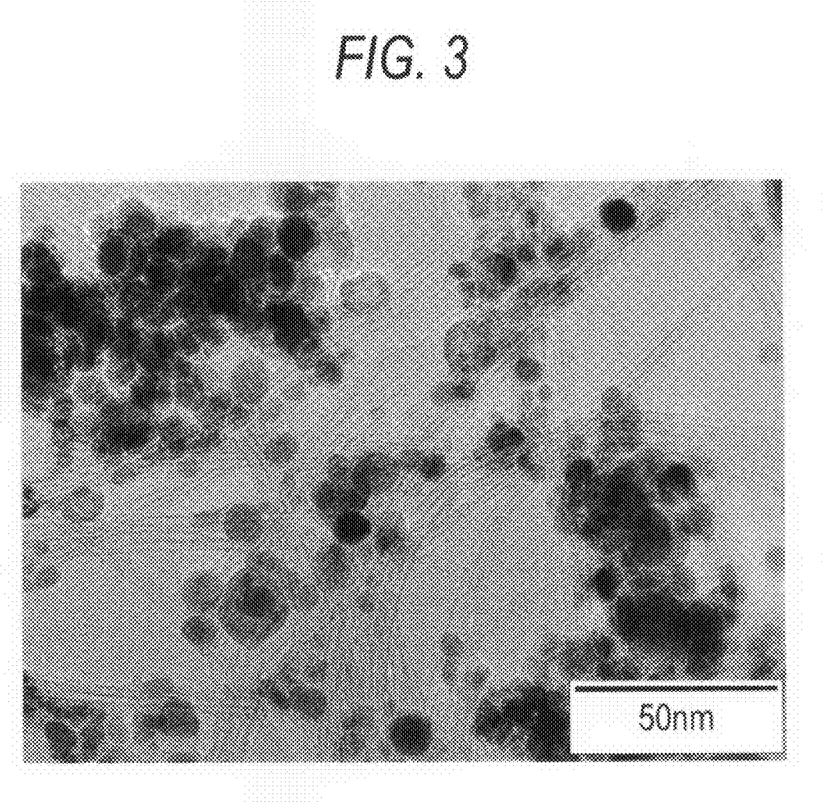
FIG. 3 is a transmission type electron micrograph of samples 1 to 3 of Example 2.

By using hydrogen at a flow rate of 7 L/min as a carrier gas, the solution was sprayed to the reaction tube in the electric furnace heated to 1200° C. at a velocity of flow of 100 μL/min for 70 minutes, thereby to carry out gas phase flow thermal CVD synthesis. The products were collected by the recovery filter 7. The yields of the samples 1, 2, and 3 were 13.1 mg, 22.6 mg, and 24.5 mg, respectively, where the samples 1, 2, and 3 were the three types of products manufactured by using the raw material solutions 1, 2, and 3, respectively. The samples 1 to 3 were observed under a transmission electron microscope (JEM1010, manufactured by JEOL Ltd., the same applies hereinafter). As a result, all the samples 1 to 3 were single wall carbon nanotubes with a diameter of about 1 to 4 nm. As an example, the transmission electron micrograph of the sample 2 is shown in FIG. 3.

Example 3

In the same manner as in Example 1, in a 50-mL flask, 20.0 g of toluene was charged. As nanocapsule-type catalyst raw materials, 6.6 g of dimethyl dioctyl ammonium bromide, 1.8 g of iron (III) chloride, and 170 mg of molybdenum chloride were added and dissolved. Preparation in this ratio results in a concentration in solution of the catalyst in the solution of 30.0 wt %. To the solution, thiophene was added so as to be in an amount 1 time by mol the amount in number of moles of the iron which was the catalyst, to prepare a raw material solution. Thus, gas phase flow thermal CVD synthesis was carried out for 70 minutes in the same manner as in Example 2. The resulting product was in an amount of 37.3 mg. It was observed under a transmission electron microscope. As a result, it was found to be a single wall carbon nanotube with a diameter of about 1 to 4 nm (concentration in solution of the catalyst 30.0 wt %).

Example 4

In the same manner as in Example 1, in a 50-mL flask, 10.0 g of toluene was charged. As nanocapsule-type catalyst raw materials, 18.01 g of dimethyl dioctyl ammonium bromide, 4.81 g of iron (III) chloride, and 500 mg of molybdenum chloride were added and dissolved. Preparation in this ratio results in a concentration in solution of the catalyst in the solution of 70.0 wt %. To the solution, thiophene was added so as to be in an amount 1 time by mol the amount in number of moles of the iron which was the catalyst, to prepare a raw material solution. Thus, gas phase flow thermal CVD synthesis was carried out for 50 minutes in the same manner as in Example 2. The yield of the resulting product was 176.4 mg. This sample was observed under a transmission electron microscope. As a result, the product was found to be a single wall carbon nanotube with a diameter of about 1 to 4 nm (concentration in solution of the catalyst 70.0 wt %).

Example 5

Figure 4:
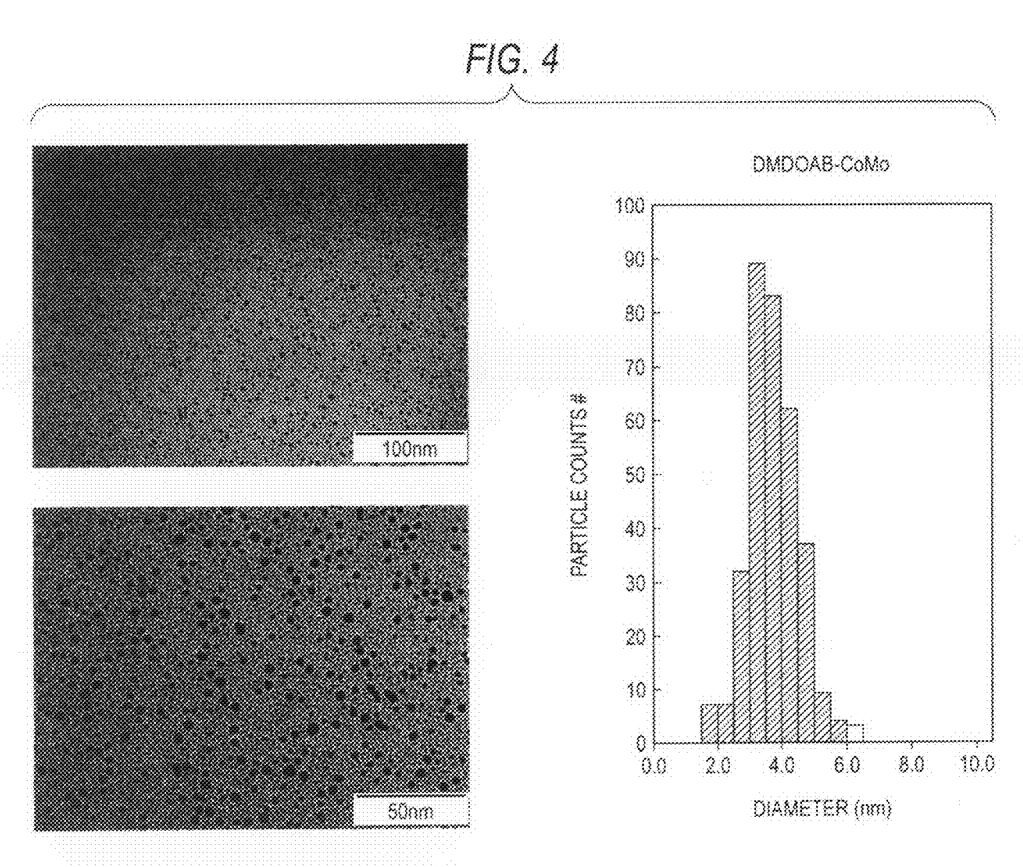
FIG. 4 are transmission type electron micrographs and the particle size distribution diagram of iron-molybdenum type ultrafine particles.

In the same manner as in Example 1, in a 50-mL flask, 20.0 g of toluene was charged. As nanocapsule-type catalyst raw materials, 3.67 g of dimethyl dioctyl ammonium bromide, 394 mg of iron (III) chloride, and 652 mg of molybdenum chloride were added and sufficiently dissolved. Sodium borohydride (manufactured by Aldrich Co., 99%) was dissolved in an amount of 765 mg in 1.5 mL of ultrapure water. The resulting solution was added with vigorous stirring to the nanocapsule-type catalyst solution. Then, it was stirred until the bubbling due to the reduction reaction ceased. Then, the solution was subjected to centrifugation under the conditions of 6000 rpm by means of a centrifugal separator (himac CT13, manufactured by Hitachi Koki Co., Ltd.). Thus, insoluble matters were removed, and the supernatant was fractionated. The iron-molybdenum type ultrafine particles in the supernatant solution were observed under a transmission electron microscope. As a result, the average particle diameter was 2.7 nm. The transmission electron micrograph and the graph of particle size distribution are shown in FIG. 4.

Example 6

Magnesium oxide (manufactured by Kishida Reagents Chemicals, Co., Ltd., guaranteed grade) was put in an amount of 2.0 g in an evaporating dish, and heated to 120° C. Then, 1.7 g of the supernatant solution prepared in Example 5 was added thereto, and evaporated to dryness with stirring, and vacuum dried in a vacuum oven set at 200° C. for 10 hours to prepare iron-molybdenum ultrafine particles-supporting catalyst.

Example 7

Figure 5:
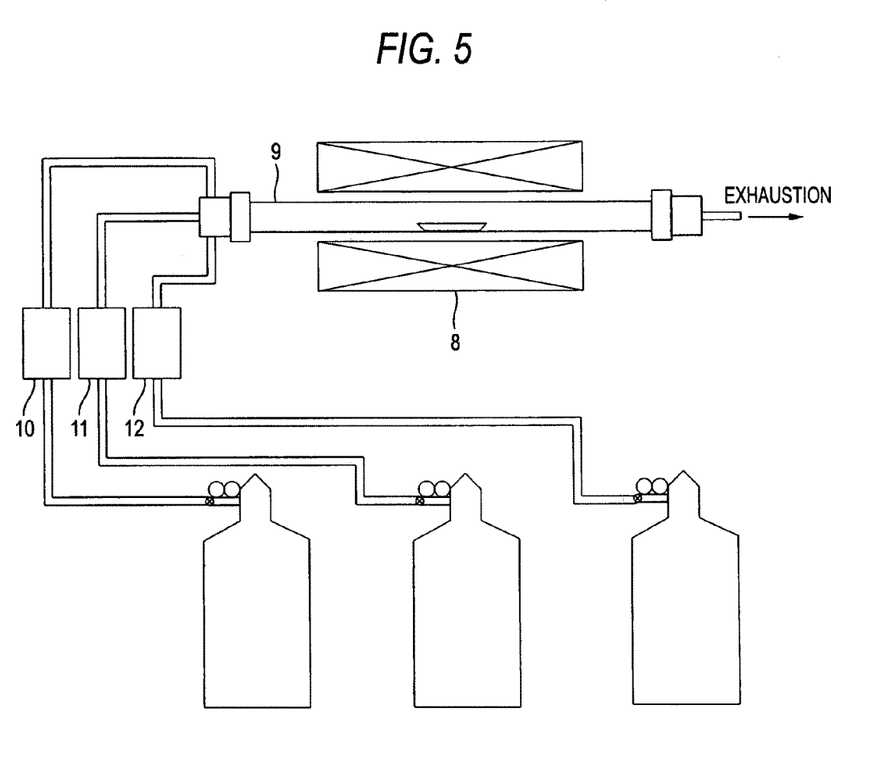
FIG. 5 is a schematic diagram of a carbon nanotube manufacturing apparatus used in Example 7.

By the use of the catalyst obtained in Example 6 and the apparatus shown in FIG. 5, carbon nanotubes were synthesized.

Figure 6:
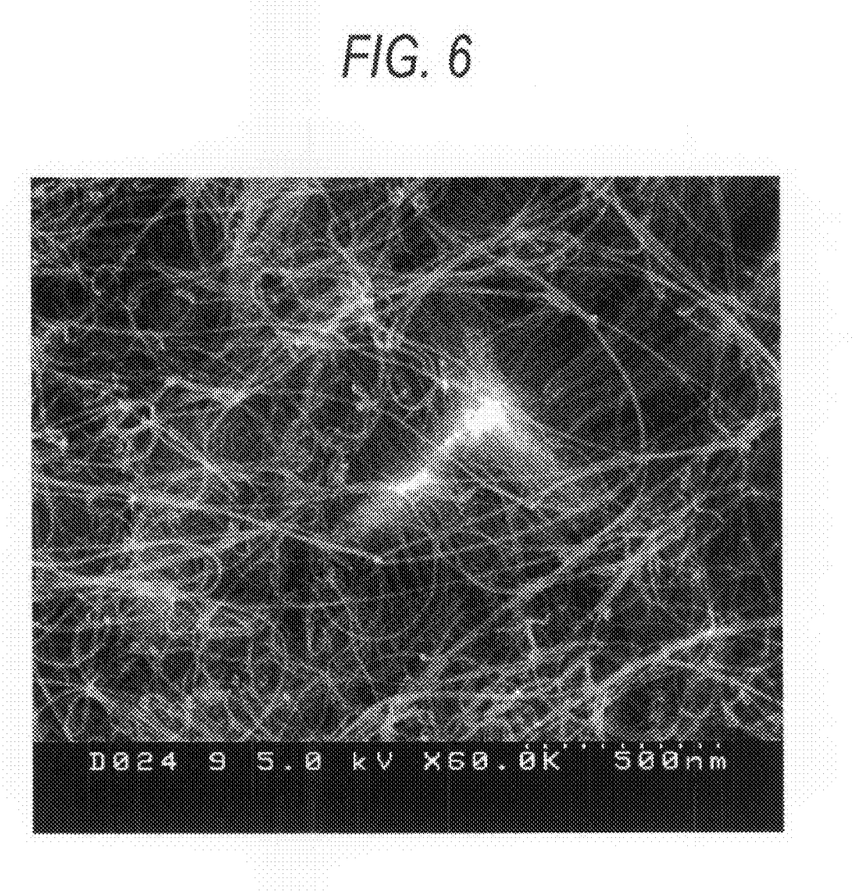
FIG. 6 is a transmission type electron micrograph of samples 4 of Example 7.

The manufacturing apparatus of FIG. 5 includes a 4-kW electric furnace 8, a reaction tube 9 made of quartz, with an internal diameter of 2.3 cm and an external diameter of 2.8 cm, a first reaction gas flowmeter 10, a second reaction gas flowmeter 11, and a carrier gas flowmeter 12. The iron-molybdenum-supporting catalyst prepared in Example 6 was put in a boat made of alumina, and introduced in the reaction tube 9. The inside of the reaction tube 9 was sufficiently replaced with argon. Then, by using argon at a flow rate of 100 mL/min as a carrier gas, heating to 750° C. was carried out. Then, a mixed gas of 3% hydrogen diluted with argon was introduced into the reaction tube at a flow rate of 500 mL/min for 5 minutes, thereby to reduce and activate the catalyst. Subsequently, a mixed gas of 1% acetylene diluted with argon was introduced into the reaction tube at 500 mL/min for 30 minutes to effect the reaction. A sample 4 was observed under a scanning electron microscope (S-5000, manufactured by Hitachi, Ltd), where the sample 4 was the supported catalyst in the boat made of alumina after reaction. As a result, it has been shown that carbon nanotubes were formed on the catalyst surface. FIG. 6 shows an electron microscope.

The invention claimed is:

1. A catalyst for manufacturing a carbon nanotube, which is used at the time when the carbon nanotube is manufactured by chemical vapor deposition method in which an atomized carbon-containing raw material is used, which is formed by self-organization of a surfactant in an organic solvent, wherein the catalyst comprises a nanocapsule-type structure having an average particle diameter of 1 to 50 nm, said nanocapsule-type structure comprising an aqueous solution of a metal compound encapsulated in the inside thereof, wherein the surfactant is at least one member selected from the group consisting of an anionic surfactant, dimethyl dialkyl ammonium halide, and a nonionic surfactant, and wherein the dimethyl dialkyl ammonium halide is dimethyl dioctyl ammonium halide.

2. A raw material solution for manufacturing a carbon nanotube, which contains an organic solvent and a catalyst for manufacturing a carbon nanotube, which is used at the time when the carbon nanotube is manufactured by chemical vapor deposition method in which an atomized carbon-containing raw material is used, wherein the catalyst comprises a nanocapsule-type structure having an average particle diameter of 1 to 50 nm, said nanocapsule-type structure comprising an aqueous solution of a metal compound encapsulated in the inside thereof, wherein the organic solvent is at least one member selected from the group consisting of toluene, benzene, xylene, cyclohexane, heptane, and hexane, wherein the raw material solution for manufacturing a carbon nanotube further contains thiophene, and wherein a mixing ratio (in number of atoms) of the thiophene to the metal compound is 0.5 to 5 times the amount of number of metal atoms of the metal compound.

* * * * *